(12) United States Patent
Hall

(10) Patent No.: US 9,965,411 B2
(45) Date of Patent: May 8, 2018

(54) NEAR FIELD COMMUNICATION (NFC) ENABLED PERIPHERAL DEVICE

(71) Applicant: Avago Technologies General IP (Singapore) Pte. Ltd., Singapore (SG)

(72) Inventor: Steven Hall, Olivenhain, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 186 days.

(21) Appl. No.: 14/724,208

(22) Filed: May 28, 2015

(65) Prior Publication Data

US 2016/0328341 A1    Nov. 10, 2016

Related U.S. Application Data

(60) Provisional application No. 62/158,255, filed on May 7, 2015.

(51) Int. Cl.
| | | |
|---|---|---|
| G06F 13/00 | (2006.01) | |
| G06F 13/22 | (2006.01) | |
| G06F 13/10 | (2006.01) | |
| G06F 13/40 | (2006.01) | |
| H04L 29/08 | (2006.01) | |
| G06F 13/28 | (2006.01) | |
| H04L 29/06 | (2006.01) | |

(52) U.S. Cl.
CPC ............ G06F 13/22 (2013.01); G06F 13/102 (2013.01); G06F 13/4022 (2013.01); G06F 13/4068 (2013.01); *G06F 13/28* (2013.01); *H04L 29/06* (2013.01); *H04L 29/08072* (2013.01)

(58) Field of Classification Search
None
See application file for complete search history.

(56) References Cited

U.S. PATENT DOCUMENTS

| | | | | |
|---|---|---|---|---|
| 2004/0041699 A1* | 3/2004 | Nantz | ...................... | G05F 7/00 340/448 |
| 2008/0305750 A1* | 12/2008 | Alon | .................... | H01Q 9/0485 455/77 |
| 2009/0284245 A1* | 11/2009 | Kirby | .................... | G06K 7/0008 323/318 |
| 2011/0127954 A1* | 6/2011 | Walley | ................ | H01M 2/0267 320/108 |
| 2013/0026981 A1* | 1/2013 | Van Der Lee | .......... | H02J 5/005 320/108 |
| 2015/0094006 A1* | 4/2015 | Choi | .................... | H04B 5/0056 455/232.1 |
| 2015/0133717 A1* | 5/2015 | Ghiron | .................. | G01R 33/02 600/14 |

(Continued)

*Primary Examiner* — Ilwoo Park
*Assistant Examiner* — Aurangzeb Hassan
(74) *Attorney, Agent, or Firm* — Sterne, Kessler, Goldstein & Fox P.L.L.C.

(57) ABSTRACT

A communication system of the present disclosure includes a communication device that is communicatively coupled to a peripheral device. The peripheral device selects a selectable impedance from among multiple selectable impedances to communicate peripheral device information to the communication device. The communication device operates in an acquisition mode of operation to determine the selectable impedance to recover the peripheral device information. Optionally, the communication device can transition to a response mode of operation to respond to the peripheral device information.

15 Claims, 6 Drawing Sheets

(56) References Cited

U.S. PATENT DOCUMENTS

| | | | | |
|---|---|---|---|---|
| 2015/0149042 A1* | 5/2015 | Cooper | ............... | B60R 16/037 |
| | | | | 701/48 |
| 2015/0249342 A1* | 9/2015 | Kapcia | ............... | H04B 5/0037 |
| | | | | 307/104 |
| 2015/0371234 A1* | 12/2015 | Huang | ............... | G06Q 20/36 |
| | | | | 705/44 |

* cited by examiner

NEAR FIELD COMMUNICATION (NFC) ENABLED PERIPHERAL DEVICE

CROSS-REFERENCE TO RELATED APPLICATIONS

The present application claims the benefit of U.S. Provisional Patent Appl. No. 62/158,255, filed May 7, 2015, which is incorporated herein by reference in its entirety.

BACKGROUND

Field of Disclosure

The present disclosure generally relates to a communication system having a communication device communicatively coupled to a peripheral device and including dynamic selection of selectable impedance from among multiple selectable impedances by the peripheral device to communicate peripheral device information to the communication device.

Related Art

The continued improvement of semiconductor fabrication processes has allowed manufacturers and designers to create smaller and more powerful electronic devices. Often times, the smaller and more powerful electronic devices include a virtual keyboard to allow a user to command and/or to enter data into these electronic devices. For example, these electronic devices often execute one or more software applications such as Short Message Service (SMS) for text messaging, electronic mailing, audio and/or video recording, a calendar and/or a phone book to provide some examples. The user of the electronic device uses the virtual keyboard to command and/or to enter data for use by the software applications. However, the virtual keyboard continues to become smaller as these electronic devices continue to become smaller causing difficulties in using the virtual keyboard. Therefore, it would be beneficial to allow the user of these smaller and more powerful electronic devices to interface with these electronic devices using an external keyboard.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

FIG. 1 illustrate a block diagram of an exemplary communication system according to an exemplary embodiment of the disclosure;

FIG. 2 graphically illustrate operation of the exemplary communication device within the communication system according to an exemplary embodiment of the disclosure;

FIG. 3A and FIG. 3B further graphically illustrate the operation of the exemplary communication device;

DETAILED DESCRIPTION OF THE DISCLOSURE

Overview

A communication system of the present disclosure includes a communication device that is communicatively coupled to a peripheral device. The peripheral device selects a selectable impedance from among multiple selectable impedances to communicate peripheral device information to the communication device. The communication device operates in an acquisition mode of operation to determine the selectable impedance to recover the peripheral device information. Optionally, the communication device can transition to a response mode of operation to respond to the peripheral device information.

An Exemplary Communication System

Figure 1:
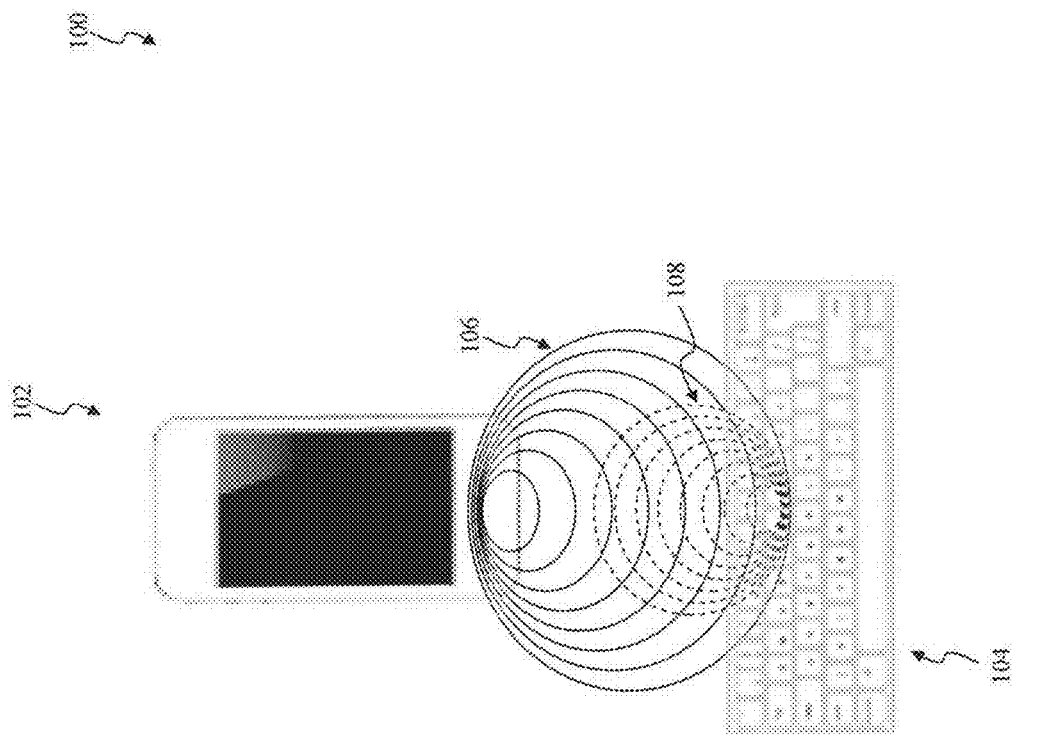

FIG. 1 illustrates a block diagram of an exemplary communication system according to an exemplary embodiment of the disclosure. As illustrated in FIG. 1, a communication system 100 includes a communication device 102 that is communicatively coupled to a peripheral device 104. Although the communication device 102 is illustrated in FIG. 1 as being a mobile phone, this is for exemplary purposes only. Those skilled in the relevant art(s) will recognize that the communication device 102 can be an all-in-one computer, a tablet computer, a personal digital assistant (PDA), a satellite navigation device, video gaming device, a kiosk system in retail and tourist settings, a point of sale system, an automatic teller machine (ATM), an electronic accessory such as a smart watch, or any other suitable communication device that will be apparent to those skilled in the relevant art(s) without departing from the spirit and scope of the present disclosure. Although the peripheral device 104 is illustrated in FIG. 1 as being a keyboard, this is for exemplary purposes only. Those skilled in the relevant art(s) will recognize that the peripheral device 104 can be a mouse, a graphic tablet, a touchscreen, a barcode reader, a scanner, a microphone, a webcam, a game controller, a stylus, a digital camera, or any other suitable device that is capable of connecting to and/or interfacing with the communication device 102 that will be apparent to those skilled in the relevant art(s) without departing from the spirit and scope of the present disclosure.

The communication device 102 and the peripheral device 104 interact with each other to exchange information, such as data and/or one or more commands to provide some examples. During operation, the communication device 102 can operate in either an acquisition mode of operation to receive the information from the peripheral device 104 or in a response mode of operation to respond to the information from the peripheral device 104.

As illustrated in FIG. 1, the communication device 102 provides a magnetic field 106 to the communication system 100 in the acquisition mode of operation. The communication device 102 applies a carrier wave, referred to as an unmodulated communication, to a first antenna to generate the magnetic field 106. The peripheral device 104 disturbs the magnetic field 106 when the magnetic field 106 comes into contact with, or is sufficiently proximate to, the peripheral device 104. Specifically, the communication device 102 is sufficiently proximate to the peripheral device 104 such that an intensity of the magnetic field 106 is related to an output impedance, or load, of the peripheral device 104.

The peripheral device 104 can dynamically select a selectable impedance from among multiple selectable impedances to cause a change ht the intensity of the magnetic field 106 which is detectable by the communication device 102. Each of the multiple selectable impedances can include one or more resistors, one or more capacitors, and/or one or more inductors. The peripheral device 104 can assign each of the multiple selectable impedances to various peripheral device information, such as corresponding data and/or one or more corresponding commands. In an exemplary embodiment, the peripheral device information can include a first command that the peripheral device 104 is ready to transmit peripheral data, such as keystrokes of a keyboard, to the communication device 102 to provide an example. The peripheral device 104 can communicate the peripheral device information to the communication device 102 by selecting its assigned selectable impedance from among the multiple selectable impedances.

Also in the acquisition mode of operation, the communication device 102 detects the selectable impedance to determine the peripheral device information. The communication device 102 can assign multiple potential intensities of the magnetic field 106 to various selectable impedances from among the multiple selectable impedances that are capable of being selected by the peripheral device 104 and can assign the multiple selectable impedances to various peripheral device information. The communication device 102 selects a potential intensity from among the multiple potential intensities which most suitably matches the intensity of the magnetic field 106 to determine the selectable impedance and determines the peripheral device information that corresponds to the determined selectable impedance. For example, the communication device 102 can assign multiple potential intensities of the magnetic field 106 to various selectable impedances from among the multiple selectable impedances that are capable of being selected by the peripheral device 104 and can assign the multiple selectable impedances to various peripheral device information. In this example, the communication device 102 selects a potential intensity from among the multiple potential intensities which most suitably matches the intensity of the magnetic field 106 to determine the selectable impedance and determines the peripheral device information that corresponds to the determined selectable impedance. Alternatively the communication device 104 can determine the peripheral device information directly from the intensity of the magnetic field 106 without explicitly detecting the selectable impedance. In this alternative, the communication device 102 can assign multiple potential intensities of the magnetic field 106 to various peripheral device information that is capable of being transmitted by the peripheral device 104. The communication device 102 selects a potential intensity from among the multiple possible potential intensities which most suitably matches the intensity of the magnetic field 106 to determine the peripheral device information.

After determining the peripheral device information, the communication device 102 can optionally transition from the acquisition mode of operation to the response mode of operation. In this mode of operation, the communication device 102 provides a response to the peripheral device information to the peripheral device 104. Specifically, the communication device 102 modulated the response onto the first carrier wave and generates the magnetic field 106 by applying the modulated response to the first antenna to communicate the response to the peripheral device 104. In an exemplary embodiment, the response can include a polling command to request the peripheral data, such as the keystrokes of the keyboard, from the peripheral device 104.

Optionally, the peripheral device 104 can include one or more internal charge storing devices, such as one or more batteries and/or one or capacitors to provide some examples, which can be wirelessly charged by the communication device 102. In this situation, the peripheral device 104 can rectify and/or regulate current induced onto the second antenna by the magnetic field 106 to provide a charging current and/or voltage to charge the internal charge storing device. In an exemplary embodiment, the peripheral device information can include a second command indicating that the internal charge storing device does not have sufficient charge, or is approaching this insufficient charge, to operate the peripheral device 104. In this exemplary embodiment the peripheral device 104 can dynamically select a corresponding selectable impedance from among the multiple selectable impedances to communicate the second command to the communication device. Thereafter, the communication device 102 can generate the magnetic field 106 when operating in the response mode of operation for charging the one or more internal charge storing devices in response to the second command.

Exemplary Operation of Communication Device 102

Figure 2:
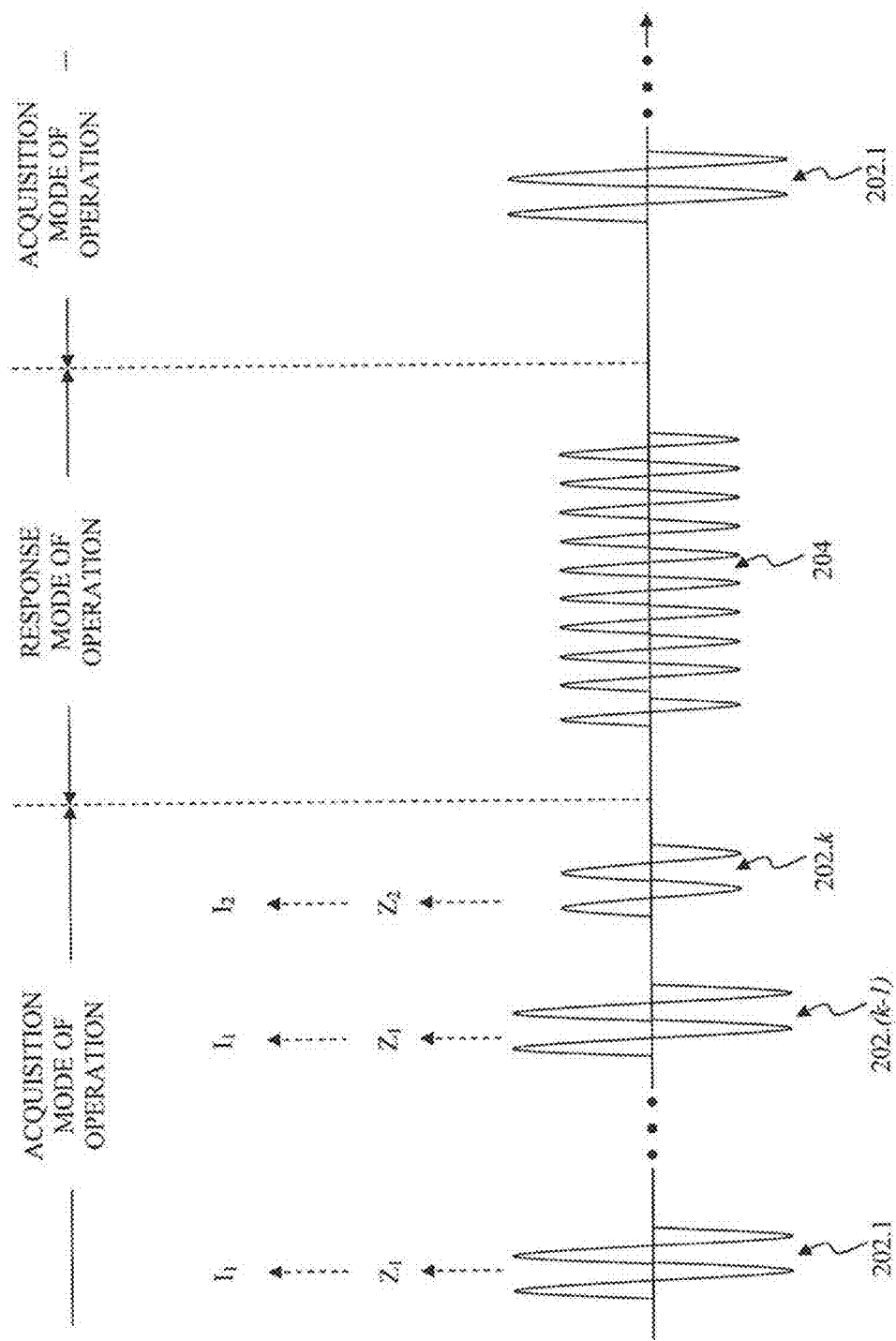

FIG. 2 graphically illustrates operation of the exemplary communication device within the communication system according to an exemplary embodiment of the disclosure. As illustrated in FIG. 2, the communication device 102 provides a series of time-varying magnetic pulses 202.1 through 202.k to the communication system 100 in the acquisition mode of operation. The communication device 102 activates a time-varying earner wave and modulates this time-varying carrier wave onto the magnetic field 106 to provide a first time-varying magnetic pulse 202.1 from among the time-varying magnetic pulses 202.1 through 202.k. Next, the communication device 102 activates the time-varying carrier wave and modulates this time-varying carrier wave onto the magnetic field to provide a second time-varying magnetic pulse 202.2 from among the time-varying magnetic pulses 202.1 through 202.k. Thereafter, the communication device 102 provides the other time-varying magnetic pulses from among the time-varying magnetic pulses 202.1 through 202.k in a substantially similar manner. The communication device 102 can provide the time-varying magnetic pulses 202.1 through 202.k in a periodic manner and/or in an aperiodic manner, for example, in response to an event such as a command from a user of the communication device 102.

The peripheral device 104 can dynamically select the selectable impedance from among the one or more selectable impedances to control the intensity of the time-varying magnetic pulses 202.1 through 202.k to communicate the peripheral device information to the communication device 102. Also in the acquisition mode of operation, the communication device 102 can determine one or more signal metrics of the time-varying magnetic pulses 202.1 through 202.k to quantify the intensities of magnetic fields. The one or more signal metrics may include one or more mean voltage and/or current levels, one or more average voltage and/or current levels, one or more instantaneous voltage and/or current levels, one or more root mean square voltage and/or current levels, one or more mean powers, one or more average powers, one or more instantaneous powers, one or more root mean square powers, and/or any other suitable signal metric of the time-varying magnetic pulses 202.1 through 202.k which will be apparent to those skilled in the relevant art(s) without departing from the spirit and scope of the disclosure. In an exemplary embodiment, each of the time-varying magnetic pulses 202.1 through 202.*k* is of a sufficient duration, such as one or two cycles of the time-varying carrier wave to provide an example, to allow for the communication device 102 to determine the one or more signal metrics of the time-varying magnetic pulses 202.1 through 202.*k*. In this exemplary embodiment, each of the time-varying magnetic pulses 202.1 through 202.*k* can be referred to as a "ping".

The communication device 102 detects the selectable impedance to determine the peripheral device information and determines the peripheral device information that corresponds to the determined selectable impedance. For example as illustrated in FIG. 2, the communication device 102 can detect that the peripheral device 104 has selected a selectable impedance $Z_1$ from among the multiple selectable impedances for a first duration of the time-varying magnetic pulse 202.1 based upon an intensity of the time-varying magnetic pulse 202.1 and determines that peripheral device information $I_1$ corresponds to the selectable impedance $Z_1$. In this example, the communication device 102 can detect that the peripheral device 104 has selected the selectable impedance $Z_1$ for a $(k-1)^{th}$ duration of the time-varying magnetic pulse 202.($k$–1) based upon an intensity of the time-varying magnetic pulse 202.($k$–1) and determines that the peripheral device information $I_1$ corresponds to the selectable impedance $Z_1$. Also in this example, the communication device 102 can detect that the peripheral device 104 has selected a selectable impedance $Z_2$ from among the multiple selectable impedances for a $k^{th}$ duration of the time-varying magnetic pulse 202.1 based upon an intensity of the time-varying magnetic pulse 202.*k* and determines that peripheral device information $I_2$ corresponds to the selectable impedance $Z_2$.

In some situations, the peripheral device information can cause the communication device 102 to transition from the acquisition mode of operation to the response mode of operation to provide a response 204. The response 204 can represent a modulated communication, such as a polling command to request peripheral data from the peripheral device 104 that is modulated onto the time-varying carrier wave, an unmodulated communication, such the time-varying carrier wave to charge one or more internal charge storing devices of the peripheral device 104, or any other suitable response that will be apparent to those skilled in the relevant art(s) without departing from the spirit and scope of the disclosure. For example, the peripheral device information $I_1$ indicates that the peripheral device 104 is not ready to transmit peripheral device information, such as the keystrokes of the keyboard, to communication device 102. In this situation, the communication device 102 remains in the acquisition mode of operation to transmit a subsequent time-varying magnetic pulses from among the time-varying magnetic pulses 202.1 through 202.*k*. As another example, the peripheral device information $I_2$ can be assigned to the first command that the peripheral device 104 is ready to transmit peripheral data, such as keystrokes of the keyboard, to the communication device 102 and/or to the second command indicating that the internal charge storing device does not have sufficient charge, or is approaching this insufficient charge, to operate the peripheral device 104. In this situation, the communication device 102 transitions from the acquisition mode of operation to the response mode of operation to provide the response 204. The response 204 can include a polling command to request the peripheral data, such as the keystrokes of the keyboard, from the peripheral device 104 in response to the first command and/or the magnetic field 106 for charging the one or more internal charge storing devices in response to the second command. After providing the response 204, the communication device 102 to transition front the response mode of operation to the acquisition mode of operation to provide the time-varying magnetic pulses 202.1 through 202.*k*.

Calibration of the Exemplary Communication Device

Figure 3A:
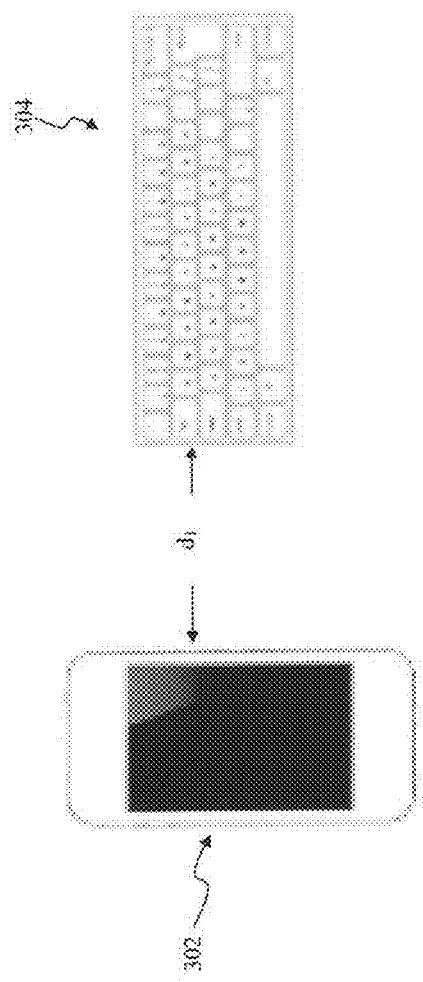
Figure 3B:
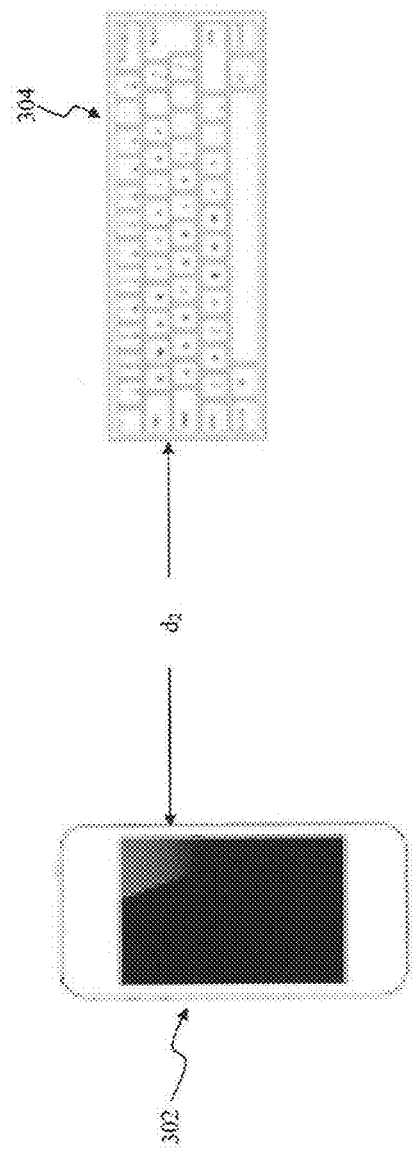

FIG. 3A and FIG. 3B further graphically illustrate the operation of the exemplary communication device. As illustrated in FIG. 3A, a communication device 302 is situated at a distance $d_1$, such as one centimeter, from a peripheral device 304 and, as illustrated in FIG. 3B, a communication device 302 is situated at a distance $d_2$ that is greater than distance $d_1$, such as three centimeters, from the peripheral device 304. The communication device 302 can represent an exemplary embodiment of the communication device 302 and the peripheral device 304 can represent an exemplary embodiment of the peripheral device 104.

As discussed above, the communication device 302 can determine one or more signal metrics to quantity the intensity of a magnetic field to detect the selectable impedance that has been selected by the peripheral device 304. However, the intensity of magnetic fields is related to the distance, such as the distance $d_1$ and the distance $d_2$, between the communication device 302 and the peripheral device 304. For example, the communication device 302 can properly detect the selectable impedance that has been selected by the peripheral device 304 when the peripheral device 304 is at the distance $d_1$ from the communication device 302. However, in this example, if the peripheral device 304 were moved to the distance $d_2$, the communication device 302 may not be able to properly detect the selectable impedance that has been selected by the peripheral device 304.

To allow the communication device 302 to operate with the peripheral device 304 over the distance $d_2$, or any other suitable distance, the communication device 302 can operate in a calibration mode of operation. In the calibration mode of operation, the communication device 302 causes the peripheral device 304 to select a predetermined impedance, referred to as a calibration impedance, from among the one or more selectable impedances. Thereafter, the communication device 302 can provide a magnetic field, such as the magnetic field 106 to a communication system, such as the communication system 100, and can determine an intensity of the magnetic field, referred to as a determined calibration intensity, with the peripheral device 304 having selected the calibration impedance.

From the discussion above, the communication device 302 can assign multiple potential intensities of the magnetic field to various selectable impedances from among the multiple selectable impedances that are capable of being selected by the peripheral device 304 and can assign the multiple selectable impedances to various peripheral device information. The communication device 302 can adjust, such as increase and/or decrease, the multiple potential intensities of the magnetic field in response to the determined calibration intensity. For example, the communication device 302 can assign a first potential intensity of the magnetic field to correspond to a first selectable impedance when the communication device 302 is situated at the distance $d_1$ from the peripheral device 304. In this example, the communication device 302 can adjust the first potential intensity of the magnetic field such that the first potential intensity of the magnetic field corresponds to the first selectable impedance when the communication device 302 is situated at the distance $d_2$ from the peripheral device 304. In an exemplary embodiment the adjustment of the multiple potential intensities of the magnetic field is based upon comparing the determined calibration intensity to a previously determined calibration intensity and adjusting the multiple potential intensities of the magnetic field based upon a difference between the determined calibration intensity and the previously determined calibration intensity. In this exemplary embodiment, the multiple potential intensities of the magnetic field are increased when the determined calibration intensity is greater than the previously determined calibration intensity and decreased when the determined calibration intensity is less than the previously determined calibration intensity.

Exemplary Peripheral Device

Figure 4:
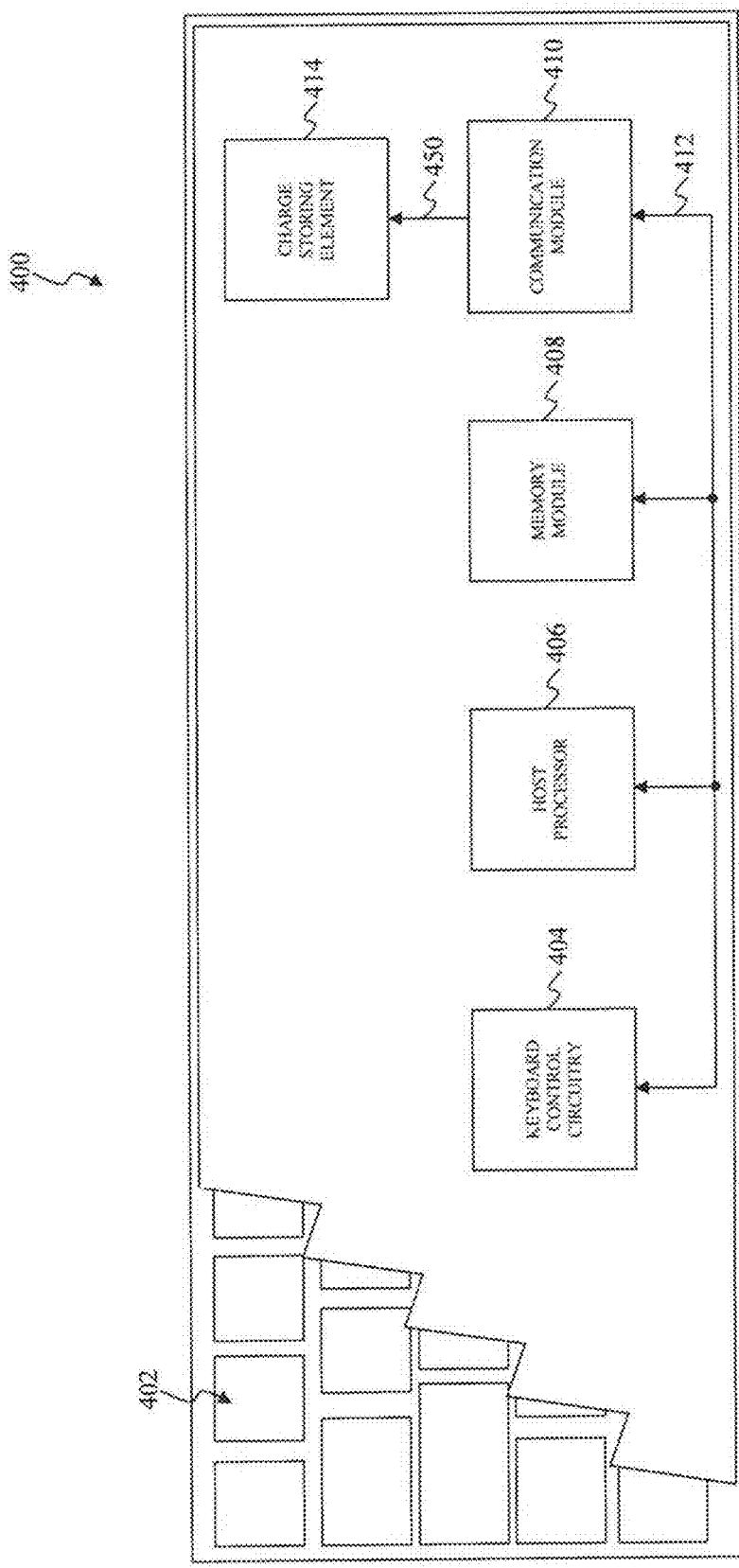
FIG. 4 illustrates a block diagram of an exemplary peripheral device according to an exemplary embodiment of the disclosure.

FIG. 4 illustrates a block diagram of an exemplary peripheral device according to an exemplary embodiment of the disclosure. A keyboard device 400 represents a peripheral device that is capable of connecting to and/or interfacing with a communication device, such as the communication device 102 and/or the communication device 302 to provide some examples. The keyboard device 400 includes a keyboard 402, keyboard control circuitry 404, a host processor 406, a memory module 408, a communication module 410 that are communicatively coupled via a communication interface 412 and an optional charge storing element 414. References in the disclosure to a "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner. The keyboard device 400 can represent an exemplary embodiment of the peripheral device 102 and/or the peripheral device 304.

The keyboard 402 represents an input interface between a user of the keyboard device 400 and the communication device. As illustrated in FIG. 4, the keyboard 402 includes a set of mechanical key switches having various arrangements of alphabetic, numeric, and punctuation symbols. These mechanical key switches can include one or more alphabetical, numeric, and/or punctuation keys that are used in the same fashion as a typewriter keyboard to input their respective symbol into the communication device, one or more modifier keys to modify normal action of the alphabetical, numeric, and/or punctuation keys when one or more of these alphabetical, numeric, and/or punctuation keys are pressed in combination, one or more navigation, keys or cursor keys to move a cursor of the communication device to different positions on a display area of the communication device, and/or any other suitable keys that will be apparent to those skilled in the relevant art(s) without departing from the spirit and scope of the present disclosure. The mechanical key switches can be implemented as rubber dome switches, membrane switches, metal contact switches, foam element switches, and/or other suitable switches that will be apparent to those skilled in the relevant art(s) without departing from the spirit and scope of the present disclosure. The keyboard 402 also includes a key matrix representing a grid of circuits underneath the mechanical key switches.

The keyboard control circuitry 404 analyzes the key matrix to determine whether one or more mechanical key switches from among the mechanical key switches have been pressed by the user. The key matrix includes electrical switches that are arranged in rows and columns to form a matrix. Each of the electrical switches in the matrix is coupled to a corresponding mechanical key switch from among the mechanical key switches. When the user of the keyboard device 400 presses the one or more mechanical key switches, their corresponding electrical switches close coupling their corresponding rows to their corresponding columns. The keyboard control circuitry 404 sequentially charges the columns of the key matrix and scans the rows of the key matrix to detect those electrical switches from among the electrical switches whose corresponding rows are coupled to their corresponding columns indicating that their corresponding mechanical key switches have been pressed. The keyboard control circuitry 404 converts locations of these corresponding mechanical key switches within the key matrix into various digital codes for storage in the memory module 408. In an exemplary embodiment, the keyboard control circuitry 404 can be implemented within the host processor 406.

The host processor 406 controls overall operation and/or configuration of the keyboard device 400. The host processor 400 dynamically selects a selectable impedance from among the one or more selectable impedances for the keyboard device 400. The host processor 406 can access an impedance table that is stored in the memory module 408 and can dynamically select the selectable impedance from the impedance table. The impedance table assigns each of the multiple selectable impedances to various peripheral device information, such as corresponding data and/or one or more corresponding commands, for example, the host processor 406 can dynamically select a first selectable impedance from among the one or more selectable impedances when the keyboard device 400 is ready to transmit keystrokes of the one or more mechanical key switches to the communication device. In this example, the host processor 406 receives a memory indication, such as an interrupt or other command to provide some examples, that the memory module 408 has reached, or approaching, its capacity. In this situation, the host processor 406 can dynamically select the first selectable impedance upon receipt of the memory indication. As another example, the host processor 406 can dynamically select a second selectable impedance from among the one or more selectable impedances when the optional charge storing element 414 does not have sufficient charge, or is approaching this insufficient charge, to operate the keyboard device 400. In this other example, the host processor 406 monitors a charge stored in the optional charge storing element 414 and can dynamically select the second selectable impedance when the optional charge storing element 414 does not have sufficient charge, or is approaching this insufficient charge, to operate the keyboard device 400. After selecting the selectable impedance from the impedance table, the host processor 406 provides an impedance selection command to cause the communication module 410 to change its impedance to the selectable impedance.

Additionally, the host processor 406 can configure the keyboard device 400 to respond to a response from the communication module in response to the selectable impedance. For example, the host processor 406 can access the various digital codes corresponding to the keystrokes of the one or more mechanical key switches that are stored in the memory module 408 in response to a polling command from the communication device. In this example, the host processor 406 can frame the various digital codes into payloads of information packets and can, optionally, attach headers to these payloads to form the information packets. The headers can include keyboard device information such as a source address of the keyboard device 400, a destination address of the communication device, and/or any other suitable information that will be apparent to those skilled in the relevant art(s). Thereafter, the host processor 406 can forward the information packets to the communication module 410 for transmission to the communication device.

The memory module 408 stores the impedance table and the various digital codes corresponding to the keystrokes of the one or more mechanical key switches. The memory module 408 can include volatile memory, such as static random, access memory (SRAM) or dynamic RAM (DRAM) to provide some examples, and/or non-volatile memory, such as flash memory or random access memory (ROM) to provide some examples. In an exemplary embodiment, the various digital codes are stored in the volatile memory and the impedance table is stored in the non-volatile memory. In this exemplary embodiment, the memory module 408 monitors a capacity of the volatile memory and provides the memory indication that the volatile memory has reached, or approaching, its capacity to host processor 406.

The communication module 410 provides an interface between the keyboard device 400 and the communication device. The communication module 410 dynamically selects the selectable impedance from among the multiple selectable impedances in response to the impedance selection command from the host processor 406. The communication module 410 includes a tuned resonant circuit that includes, or is coupled to, one or more antennas for interfacing with the communication device. The tuned resonant circuit can be implemented as one or more parallel and/or one or more serial combinations of one or more resistors, one or more capacitors, one or more inductors, and the multiple selectable impedances. The multiple selectable impedances can include one or more resistors, one or more capacitors, and/or one or more inductors coupled to multiple switching elements. The communication module 410 activates a corresponding switching element from among the multiple switching elements to include its associated one or more resistors, one or more capacitors, and/or one or more inductors into the tuned resonant circuit or 410 deactivates the corresponding switching element to exclude its associated one or more resistors, one or more capacitors, and/or one or more inductors into the tuned resonant circuit. In an exemplary embodiment, the host processor 406 can cause the communication module 410 to activate one or more first switching elements from among the multiple switching elements to select a first selectable impedance from among the multiple selectable impedances to indicate that the keyboard device 400 is ready to transmit the keystrokes of the one or more mechanical key switches. In another exemplary embodiment, the host processor 406 can cause the communication module 410 to activate one or more second switching elements from among the multiple switching elements to select a second selectable impedance from among the multiple selectable impedances to indicate that the optional charge storing element 414 does not have sufficient charge, or is approaching this insufficient charge, to operate the keyboard device 400.

The communication module 410 can include one or more of: a Bluetooth module, a Global Position System (GPS) module, a cellular module, a wireless local area network (WLAN) module, a near field communication (NFC) module, a radio frequency identification (RFID) module and/or a wireless power transfer (WPT) module. The Bluetooth module, the cellular module, the WLAN module, the NFC module, and the RFID module provide wireless communication between the communication device 100 and other Bluetooth, other cellular, other WLAN, other NFC, and other RFID enabled communication devices, respectively. In accordance with various communication standards or protocols. These various communication standards or protocols can include various cellular communication standards such as a third Generation Partnership Project (3GPP) Long Term Evolution (LTE) communication standard, a fourth generation (4G) mobile communication standard, or a third generation (3G) mobile communication standard, various networking protocols such a Wi-Fi communication standard, various NFC/RFID communication protocols such as ISO 1422, ISO/IEC 14443, ISO/IEC 15693, ISO/IEC 18000, or FeliCa to provide some examples. The GPS module receives various signals from various satellites to determine location information for the communication device 100. The WPT module supports wireless transmission of power between the communication device 100 and another WPT enabled communication device.

Each of the Bluetooth module, the cellular module, the WLAN module, the NFC module, and/or the RFID module can include a transmitter, a receiver, along with one or more processors, circuitry, and/or logic configured to transmit and/or receive wireless communications via the one or more antennas. Those skilled in the relevant art(s) will recognize that the transmitter and/or the receiver can include, but is not limited to, a digital signal processor (DSP), a modulator and/or a demodulator, a digital-to-analog converter (DAC), an analog-to-digital converter (ADC), and/or one or more frequency converters, such as one or more mixers, one or more local oscillators, and/or one or more filters to provide some examples.

The communication interface 412 routes various communications between the keyboard 402, the keyboard control circuitry 404, the host processor 406, the memory module 408, and/or the communication module 410. The communication interface 412 can be implemented as a series of wired and/or wireless interconnections between the keyboard 402, the keyboard control circuitry 404, the host processor 406, the memory module 408, and/or the communication module 410. The interconnections of the communication interface 412 can be arranged to form a parallel interface to route communication between the keyboard 402, the keyboard control circuitry 404, the host processor 406, the memory module 408, and/or the communication module 410, or a serial interface to mute communication between the keyboard 402, the keyboard control circuitry 404, the host processor 406, the memory module 408, and/or the communication module 410, or any combination thereof.

The optional charge storing element 414 provides operational power for the keyboard device 400. The optional charge storing element 414 can be implemented using one or more capacitors, one or more batteries, and/or any other suitable means that can store electrical charge that will be apparent to those skilled in the relevant art(s) without departing from the spirit and scope of the present disclosure. The one or more batteries may include one or more nickel-cadmium (NiCd), one or more nickel metal hydride (NiMH), and/or one or more lithium-ion (Li-ion) cells. However, this example is not limiting, those skilled in the relevant art(s) may implement the one or more batteries using other battery chemistries without departing from the scope and spirit of the present disclosure. As illustrated in FIG. 4, the optional charge storing element 414 can receive a charging power 450, such as a charging current and/or charging voltage, from the communication module 410. The communication module 410 can rectify and/or regulate a communication signal provided by the communication device to provide the charging power 450. Alternatively, or in addition to, the optional charge storing element 414 can receive the charging power 450 from an external power source, such as a residential or a commercial alternating current (AC) power source to provide an example. In this alternative, the optional charge storing element 414 can include a rectifier and/or a regulator to regulate the charging power 450 provided by the external power source.

Figure 5:
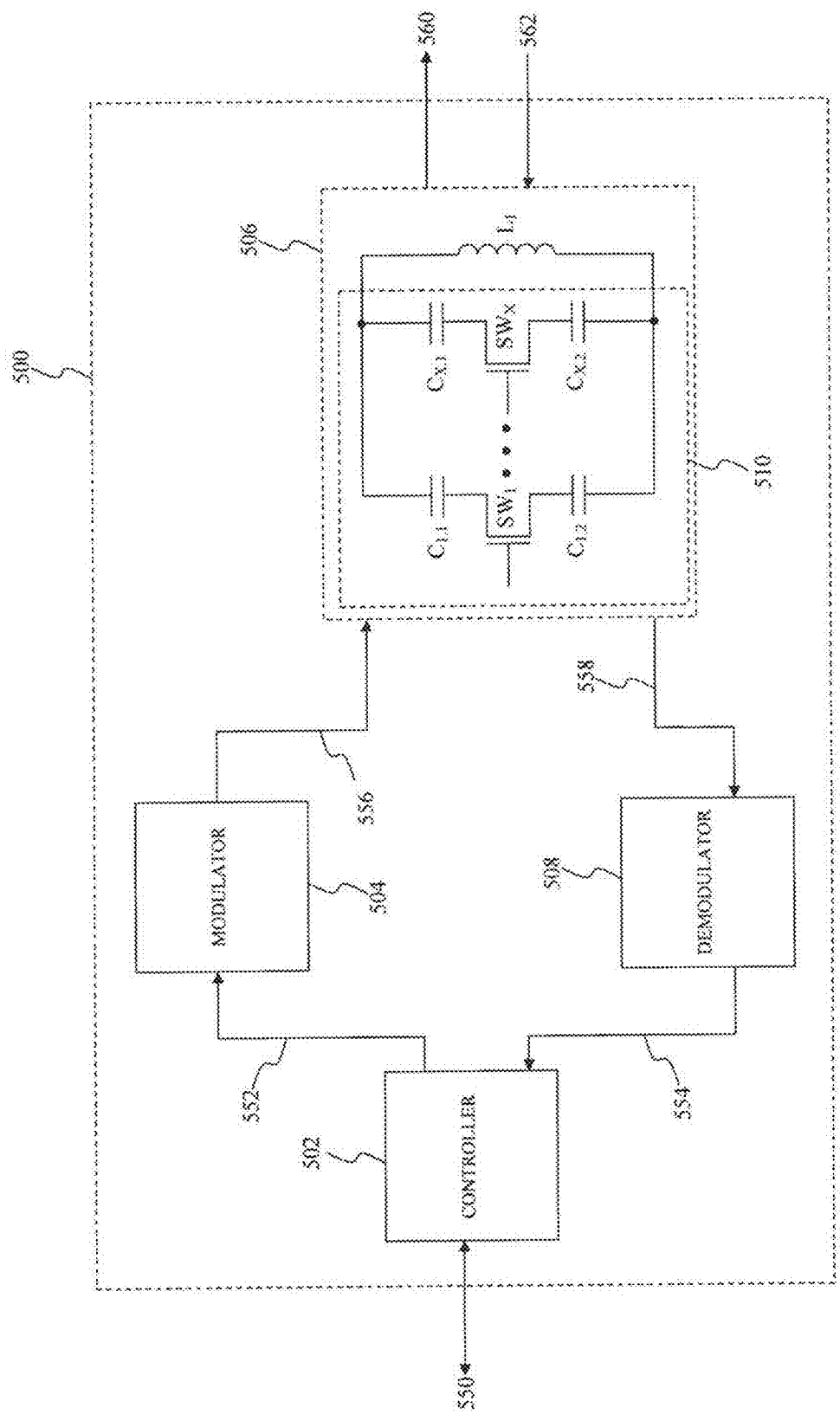
FIG. 5 illustrates a block diagram of an exemplary communication module that can be implemented within the peripheral device according to an exemplary embodiment of the disclosure.

Exemplary Communication Module that can be Implemented within the Peripheral Device FIG. 5 illustrates a block diagram of an exemplary communication module that can be implemented within the peripheral device according to an exemplary embodiment of the disclosure. A near field communications (NFC) module 500 provides an interface between a keyboard device, such as the keyboard device 400, and a communication device, such as the communication device 102 and/or the communication device 302 to provide some examples. The NFC module 500 includes a controller 502, a modulator 504, an antenna module 506, and a demodulator 508. The NFC module 500 can represent an exemplary embodiment of the communication module 410.

The controller module 502 controls overall operation and/or configuration of the NFC module 500. The controller module 502 provides information 550 to and/or receives the information 550 from a processor, such as the keyboard control circuitry 404 and/or the host processor 406 to provide softie examples, and/or one or more data storage devices, such as the memory module 408 to provide an example. In an exemplary embodiment, the controller module 502 can be implemented within the host processor. In another exemplary embodiment, the information 550 can include the information packets that contain the various digital codes corresponding to the keystrokes of the keyboard device that are stored in the one or more data storage devices of the keyboard device. In this further exemplary embodiment, the controller module 502 can provide the information packets as transmission information 552 for transmission to the communication device.

Additionally, the controller module 502 can provide recovered information 554 from the demodulator module 508 as the information 550. The controller module 502 provides the recovered information 554 to the processor, such as the keyboard control circuitry 404 and/or the host processor 406 to provide some examples, and/or the one or more data storage devices, such as the memory module 408 to provide an example.

Further, the controller module 502 may also use the information 550 and/or the recovered information 554 to control the overall operation and/or configuration of the NFC module 500. For example, the controller module 502 may issue and/or execute the one or more commands in accordance with the information 550 and/or the recovered information 554, if appropriate, to control operations of the NFC module 500, such as a transmission power, a transmission data rate, a transmission frequency, a modulation scheme, a bit and/or a byte encoding scheme, the selectable impedance and/or any other suitable operation parameter that will be apparent to those skilled in the relevant art(s) without departing from the spirit and scope of the disclosure. In an exemplary embodiment, the information 550 can include the impedance selection command that is received from the host processor. In this exemplary embodiment, the controller module 502 can cause the antenna module 506 to change its impedance to the selectable impedance.

The modulator 504 modulates the transmission information 552 onto a carrier wave using any suitable analog or digital modulation technique to provide a transmission signal 556. The suitable analog or digital modulation technique may include amplitude modulation (AM), frequency modulation (FM), phase modulation, (PM), phase shift keying (PSK), frequency shift keying (FSK), amplitude shift keying (ASK), quadrature amplitude modulation (QAM) and/or any other suitable modulation technique that will be apparent, to those skilled in the relevant art(s).

The antenna module 506 dynamically selects the selectable impedance from among the multiple selectable impedances in response to the impedance selection command from the controller module 502 and/or the host processor. As illustrated in FIG. 5, the antenna module 506 includes an impedance selection module 510. The impedance selection module 510 dynamically selects the selectable impedances from among the multiple selectable impedances to dynamically control an impedance of the keyboard device. The impedance selection module 510 includes capacitors $C_{1.1}$, $C_{1.2}$, through $C_{X.1}$ and $C_{X.2}$ and switching elements $SW_1$ through $SW_X$. Each of the switching elements $SW_1$ through $SW_X$ is coupled between capacitors from among the capacitors $C_{1.1}$, $C_{1.2}$, through $C_{X.1}$ and $C_{X.2}$. The controller module 502 and/or the host controller activates a corresponding switching element from among the switching elements $SW_1$ through $SW_X$ to include its corresponding capacitors as part of the impedance of the keyboard device from among the capacitors $C_{1.1}$, $C_{1.2}$, through $C_{X.1}$ and $C_{X.2}$ and/or deactivates the corresponding switching element to exclude its corresponding capacitors as part of the impedance of the keyboard device. However, those skilled in the relevant art(s) will recognize that the impedance selection module 510 can be implemented differently using one or more resistors, one or more capacitors, and/or one or more inductors to dynamically control the impedance of the keyboard device without departing from the spirit and scope of the present disclosure. The impedance selection module 510 and an antenna of the antenna module 506, represented by an inductor $L_1$, are configured and arranged in parallel to form a parallel tuned resonant circuit. However, those skilled in the relevant art(s) will recognize that the impedance selection module 510 and the antenna can be configured and arranged in series to form a series resonant circuit without departing from the spirit and scope of the present disclosure.

The demodulator module 508 demodulates a reception signal 558 using any suitable analog or digital modulation technique to provide the recovered information 554. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM), and/or any other suitable modulation technique that will be apparent to those skilled in the relevant art(s).

Although not illustrated in FIG. 5, the NFC module 500 can optionally include a power harvesting module to derive or harvest a charging power, such as the charging power 450, from a magnetic field generated by the communication device. This magnetic field induces a current onto the antenna of the antenna module 506. The power harvesting module rectifies and/or regulates the induced current to provide the charging power.

Exemplary Communication Device

Figure 6:
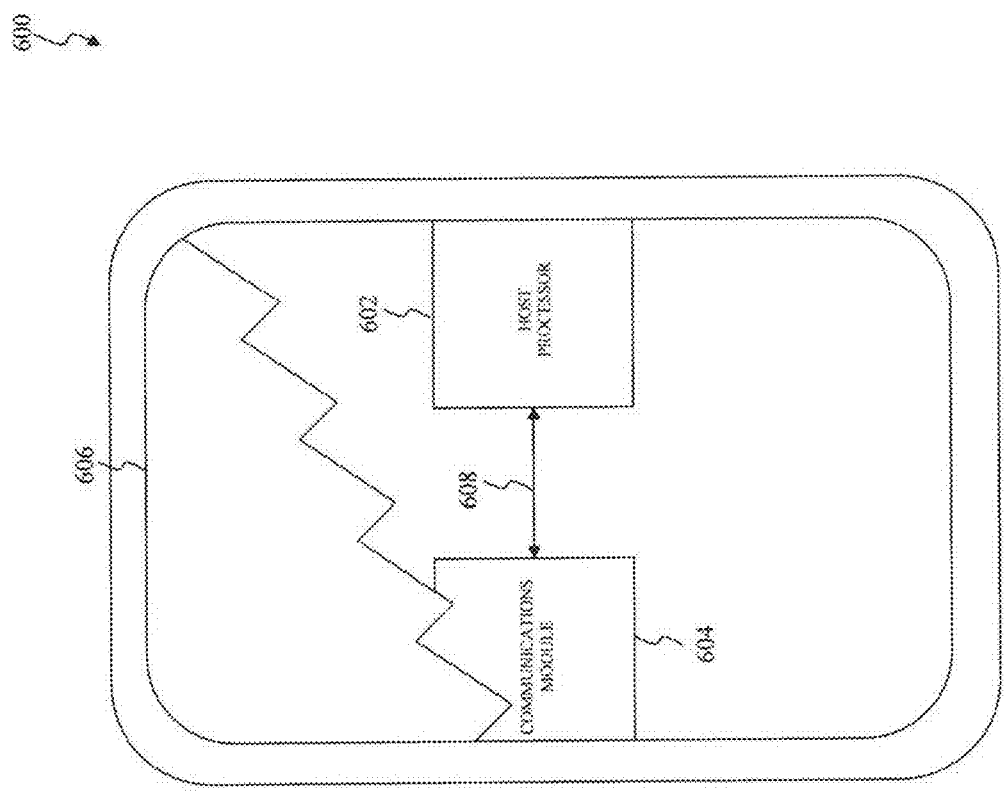
FIG. 6 illustrates a block diagram of an exemplary communication device according to an exemplary embodiment of the disclosure.

FIG. 6 illustrates a block diagram of an exemplary communication device according to an exemplary embodiment of the disclosure. As illustrated in FIG. 6, the communication device 600 can include a host processor 602, a communication module 604, and a touch-screen display 606 that are communicatively coupled via a communication interface 608. The communication device 600 can represent an exemplary embodiment of the communication device 102 and/or the communication device 302.

The host processor 602 controls overall operation and/or configuration of the communication device 600. The host processor 602 can receive and/or process information from a user interface such as an alphanumeric keypad, a microphone, a mouse, a speaker, and/or from other electrical devices or host devices that are coupled to the communication device 600. The host processor 602 can provide this information to the communication module 604 and/or the touch-screen display 606. Additionally, the host processor 602 can receive and/or process information from the communication module 604 and/or the touch-screen display 606. The host processor 602 can provide this information to the communication module 604 and/or the touch-screen display 606 and/or to other electrical devices or host devices. Further, the host processor 602 can execute one or more software applications such as Short Message Service (SMS) for text messaging, electronic mailing, audio and/or video recording, a calendar and/or a phone book to provide some examples.

Further, the host processor 602 can cause the communication module 604 to provide a magnetic field, such as the magnetic field 106 and/or the time-varying magnetic pulses 202.1 through 202.$k$ to provide an example, in the acquisition mode of operation. Thereafter, the host processor 602 can detect the selectable impedance from among the multiple selectable impedances which has been dynamically selected by a peripheral device, such as the peripheral device 104, the peripheral device 304, and/or the keyboard device 400 to provide some examples, based upon an intensity of the magnetic field. The host processor 602 can determine the intensity of the magnetic field and/or can receive an indication of the intensity of the magnetic field, such as one or more signal metrics of the magnetic field to provide an example, from the communication module 604. Typically, the host processor 602 accesses an impedance table to determine the selectable impedance. The impedance table can assign multiple potential intensities of the magnetic field to various selectable impedances from among the multiple selectable impedances that are capable of being selected by the peripheral device and can assign the multiple selectable impedances to various peripheral device information. The host processor 602 selects a potential intensity from among the multiple potential intensities which most suitably matches the intensity of the magnetic field to determine the selectable impedance and determines the peripheral device information that corresponds to the determined selectable impedance.

For example, the impedance table can assign a first potential intensity of the multiple potential intensities of the magnetic field to a first selectable impedance from among multiple selectable impedances that are capable of being selected by the peripheral device and can associate the first selectable impedance to a first command indicating that the peripheral device is ready to transmit keystrokes to the communication device 600. In this example, the host processor 602 determines that the peripheral device has transmitted the first command when the intensity of the magnetic field most suitably matches the first potential intensity. As another example, the impedance table can assign a second potential intensity of the multiple potential intensities of the magnetic field to a second selectable impedance from among multiple selectable impedances that are capable of being selected by the peripheral device and can associate the second selectable impedance to a second command indicating that the peripheral device does not have sufficient charge, or is approaching this insufficient charge, to operate. In this other example, the host processor 602 determines that the peripheral device has transmitted the second command when the intensity of the magnetic field most suitably matches the second potential intensity.

After determining the peripheral device information, the host processor 602 can optionally transition the communication device 600 from the acquisition mode of operation to the response mode of operation. In this mode of operation, the host processor 602 can cause the communication module 604 to provide a response to the peripheral device information to the peripheral device.

The communication module 604 provides voice or data communication for a user of the communication device 600. The communication module 604 can include one or more of: a Bluetooth module, a Global Position System (GPS) module, a cellular module, a wireless local area network (WLAN) module, a near field communication (NFC) module, a radio frequency identification (RFID) module and/or a wireless power transfer (WPT) module. The Bluetooth module, the cellular module, the WLAN module, the NFC module, and the RFID module provide wireless communication between the communication device 600 and other Bluetooth, other cellular, other WLAN, other NFC, and other RFID enabled communication devices, respectively, in accordance with various communication standards or protocols. These various communication standards or protocols can include various cellular communication standards such as a third Generation Partnership Project (3GPP) Long Term Evolution (LTE) communication standard, a fourth generation (4G) mobile communication standard, or a third generation (3G) mobile communication standard, various networking protocols such a Wi-Fi communication standard, various NFC/RFID communication protocols such as ISO 1422, ISO/IEC 14443, ISO/IEC 15693, ISO/IEC 18000, or FeliCa to provide some examples. The GPS module receives various signals from various satellites to determine location information for the communication device 600. The WPT module supports wireless transmission of power between the communication device 600 and another WPT enabled communication device.

Each of the Bluetooth module, the cellular module, the WLAN module, the NFC module, and/or the RFID module can include a transmitter, a receiver, along with one or more processors, circuitry, and/or logic configured to transmit and/or receive wireless communications via one or more antennas. Those skilled in the relevant art(s) will recognize that the transmitter and/or the receiver can include, but is not limited to a digital signal processes (DSP), modulator and/or demodulator, a digital-to-analog converter (DAC), an analog-to-digital converter (ADC), and/or one or more frequency converters, such as one or more mixers, one or more local oscillators, and/or one or more filters to provide some examples.

The touch-screen display 606 provides a graphical user interface far the user of the communication device 600. The touch-screen display 606 operates as an output device to provide images relating to the voice or the data communication and/or the one or more applications to the user of the communication device 600. The touch-screen display 606 also operates as an input device to receive one or more commands and/or data from the user of the communication device 600 for the voice or data communication, and/or the one or more applications.

The communication interface 608 routes various communications between the host processor 602, the communication module 604, and the touch-screen display 606. The communication interface 608 can be implemented as a series of wired and/or wireless interconnections between the host processor 602, the communication module 604, and the touch-screen display 606. The interconnections of the communication interface 608 can be arranged to form a parallel interface to route communication between the host processor 602, the communication module 604, and the touch-screen display 606 in parallel, or a serial interface to route communication between the host processor 602, the communication module 604, and the touch-screen display 606, or any combination thereof.

Conclusion

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein cars represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A communication system, comprising:
    a peripheral device configured to select a selectable impedance from among a plurality of selectable impedances to communicate peripheral device information corresponding to the selectable impedance; and
    a communication device configured to:
        assign corresponding potential intensities from among a plurality of potential intensities of a generated magnetic field to corresponding selectable impedances from among a plurality of potential selectable impedances,
        assign the corresponding selectable impedances to corresponding potential peripheral device information from among a plurality of potential peripheral device information,
        determine an intensity of the generated magnetic field,
        select a potential intensity from among the plurality of potential intensities which most suitably matches the intensity of the generated magnetic field,
        select a potential peripheral device information from among the plurality of potential peripheral device information that corresponds to the potential intensity to determine the peripheral device information.

2. The communication system of claim 1, wherein the communication device is further configured to generate the magnetic field.

3. The communication system of claim 1, wherein the peripheral device information comprises:
    a first command that the peripheral device is ready to transmit the peripheral device information to the communication device; or
    a second command indicating that an internal charge storing device of the peripheral device is approaching an insufficient charge to operate the peripheral device.

4. The communication system of claim 1, wherein the communication device is further configured to provide a response to the peripheral device information.

5. A communication system, comprising:
    a peripheral device configured to select a selectable impedance from among a plurality of selectable impedances to communicate peripheral device information corresponding to the selectable impedance; and
    a communication device configured to:
        provide a series of time-varying magnetic pulses to the peripheral device,
        determine a signal metric of a time-varying magnetic pulse from among the series of time-varying magnetic pulses,
        assign corresponding potential signal metrics from among a plurality of potential signal metrics to corresponding selectable impedances from among a plurality of potential selectable impedances,
        assign the corresponding selectable impedances to corresponding peripheral device information from among a plurality of potential peripheral device information, select a potential signal metric from among the plurality of potential signal metrics which most suitably matches the signal metric of the time-varying magnetic pulse to detect the selectable impedance, and select a potential peripheral device information from among the plurality of potential peripheral device information that corresponds to the potential signal metric to determine the peripheral device information.

6. A communication device communicatively coupled to a peripheral device, comprising:

a near field communication (NFC) module configured to provide a series of time-varying magnetic pulses to the peripheral device; and a host processor configured to:

determine a signal metric of a time-varying magnetic pulse from among the series of time-varying magnetic pulses, assign corresponding potential signal metrics from among a plurality of potential signal metrics to corresponding selectable impedances from among a plurality of potential selectable impedances, assign the corresponding selectable impedances to corresponding peripheral device information from among a plurality of potential peripheral device information, select a potential signal metric from among the plurality of potential signal metrics which most suitably matches the signal metric of the time-varying magnetic pulse to detect a selectable impedance that has been selected by the peripheral device, and select a potential peripheral device information from among the plurality of potential peripheral device information that corresponds to the potential intensity to determine peripheral device information that has been communicated by the peripheral device.

7. The communication device of claim 6, wherein the peripheral device information comprises:

a first command that the peripheral device is ready to transmit the peripheral device information to the communication device; or a second command indicating an internal charge storing device of the peripheral device is approaching an insufficient charge to operate the peripheral device.

8. The communication device of claim 6, wherein the communication module is configured to provide a response to the peripheral device information.

9. The communication device of claim 6, wherein the response comprises:

a polling command to request the peripheral device information from the peripheral device; or an unmodulated communication to charge one or more internal charge storing devices of the peripheral device.

10. A communication device communicatively coupled to a keyboard, comprising:

a communication module configured to provide a series of time-varying magnetic pulses to the keyboard; and a host processor configured to:

determine a signal metric of a time-varying magnetic pulse from among the series of time-varying magnetic pulses, assign corresponding potential signal metrics from among a plurality of potential signal metrics to corresponding selectable impedances from among a plurality of potential selectable impedances, assign the corresponding selectable impedances to corresponding peripheral device information from among a plurality of potential peripheral device information, the plurality of potential peripheral device information including one or more keystrokes of the keyboard, select a potential signal metric from among the plurality of potential signal metrics which most suitably matches the signal metric of the time-varying magnetic pulse to detect a selectable impedance that has been selected by the peripheral device, and select a potential peripheral device information from among the plurality of potential peripheral device information that corresponds to the potential intensity to determine peripheral device information that has been communicated by the peripheral device.

11. A peripheral device communicatively coupled to a communication device, comprising:

a host processor configured to:

assign each selectable impedance from among a plurality of selectable impedances to a corresponding peripheral device information from among a plurality of peripheral device information, and select a corresponding selectable impedance from among the plurality of selectable impedances corresponding to a peripheral device information; and a communication module configured to adjust its impedance to be the selected selectable impedance to communicate the peripheral device information to the communication device, the communication module including:

an impedance selection module including a plurality of capacitors and a plurality of switching elements, each of the plurality of switching elements being coupled between capacitors from among the plurality of capacitors; and an antenna coupled to the impedance selection module.

12. The peripheral device of claim 11, wherein the impedance selection module and the antenna are coupled in parallel to form a parallel tuned resonant circuit.

13. The peripheral device of claim 11, wherein the peripheral device information comprises:

a first command that the peripheral device is ready to transmit the peripheral device information to the communication device; or a second command indicating that an internal charge storing device of the peripheral device is approaching an insufficient charge to operate the peripheral device.

14. The peripheral device of claim 13, wherein the peripheral device comprises a keyboard, and wherein the peripheral device information comprises:

one or more keystrokes of the keyboard.

15. The peripheral device of claim 11, wherein the communication module comprises a near field communication (NFC) module.

* * * * *